US012587025B2

(12) United States Patent
Wang

(10) Patent No.: US 12,587,025 B2
(45) Date of Patent: Mar. 24, 2026

(54) ELECTRICAL COUPLING CIRCUIT AND METHOD THEREOF

(71) Applicant: Industrial Technology Research Institute, Hsinchu (TW)

(72) Inventor: Yu-Long Wang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 18/536,324

(22) Filed: Dec. 12, 2023

(65) Prior Publication Data

US 2025/0192589 A1    Jun. 12, 2025

(51) Int. Cl.
*H02J 7/00* (2006.01)
*H02J 7/34* (2006.01)

(52) U.S. Cl.
CPC ............. *H02J 7/865* (2026.01); *H02J 7/345* (2013.01)

(58) Field of Classification Search
CPC ................................ H02J 7/0068; H02J 7/345
See application file for complete search history.

(56) References Cited

U.S. PATENT DOCUMENTS

| | | | |
|---|---|---|---|
| 8,941,337 B2 | 1/2015 | Uryu | |
| 9,162,639 B2 | 10/2015 | Kanzaki | |
| 9,925,878 B2 * | 3/2018 | Hashim | B60L 15/08 |
| 10,797,481 B2 | 10/2020 | Iwasaki | |
| 11,479,139 B2 * | 10/2022 | Smolenaers | H02J 7/345 |

| | | | |
|---|---|---|---|
| 2002/0012261 A1 * | 1/2002 | Moindron | H02M 7/125 |
| | | | 363/127 |
| 2014/0225430 A1 | 8/2014 | Oyobe et al. | |
| 2017/0045555 A1 * | 2/2017 | Liu | H02H 7/12 |
| 2018/0241333 A1 | 8/2018 | Sakai | |

(Continued)

FOREIGN PATENT DOCUMENTS

| | | |
|---|---|---|
| CN | 201822430 A | 6/2018 |
| CN | 209313491 U | 8/2019 |

(Continued)

OTHER PUBLICATIONS

Pakdel et al. "Design and Implementation of Lithium Battery Management System for Electric Vehicles", 2022, 9th Iranian Conference on Renewable Energy & Distributed Generation.

(Continued)

*Primary Examiner* — Daniel Cavallari
*Assistant Examiner* — Brian K Baxter
(74) *Attorney, Agent, or Firm* — WPAT, PC

(57) ABSTRACT

An electrical coupling circuit includes a first switch module including a first main switch and a first auxiliary switch, a second switch module including a second main switch and a second auxiliary switch, an energy storage module and a control module. The two ends of the first main switch and the two ends of the first auxiliary switch are connected to the first electrode of a power source and the first input end of a load. The two ends of the second main switch and the two ends of the second auxiliary switch are connected to the second electrode of the power source and the second input end of the load. The two ends of the energy storage module are connected to the first input end and the second input end. The control module is connected to the first input end, first switch module and second switch module.

22 Claims, 7 Drawing Sheets

(56) References Cited

U.S. PATENT DOCUMENTS

| | | | | |
|---|---|---|---|---|
| 2018/0272870 | A1* | 9/2018 | Burkman | H02H 9/001 |
| 2020/0269718 | A1* | 8/2020 | Isaksson | B60L 3/0046 |
| 2020/0313446 | A1* | 10/2020 | Park | H02J 7/0071 |
| 2021/0091577 | A1* | 3/2021 | Nakao | H02J 7/0029 |
| 2021/0276532 | A1 | 9/2021 | Shin | |
| 2022/0224127 | A1* | 7/2022 | Marchais | H02J 7/0024 |
| 2023/0231404 | A1 | 7/2023 | Yun | |
| 2023/0378770 | A1* | 11/2023 | Ijaz | H02J 7/342 |
| 2024/0055982 | A1* | 2/2024 | Chin | H02M 1/0058 |
| 2024/0151201 | A1* | 5/2024 | Kim | H02J 7/345 |
| 2024/0413632 | A1* | 12/2024 | Ham | H02M 3/1582 |

FOREIGN PATENT DOCUMENTS

| | | |
|---|---|---|
| CN | M587850 | 12/2019 |
| CN | 109546642 B | 4/2021 |
| CN | 202131315 A | 8/2021 |
| CN | 114006527 A | 2/2022 |
| CN | 114008905 A | 2/2022 |
| CN | 116373607 A | 7/2023 |
| TW | 201121189 A | 6/2011 |

OTHER PUBLICATIONS

Bifalco "Protecting automotive motor-drive systems from reverse polarity conditions", Oct. 2016, Texas Instruments.
Pickering "Reverse-Polarity Protection in Automotive Design", 2024, ElectronicDesign.com.
Jian et al. "Automotive EMC-Compliant Reverse-Battery Protection with Ideal-Diode Controllers", 2020, Analog Design Journal.
Zhao "Fault analysis in solar PV arrays under: Low irradiance conditions and reverse connections", 2011, IEEE.
Pop et al. "Reverse polarity protection for automotive NMOS LDO", 2021, IEEE Xplore.
Choudhary "Designing the front-end DC/DC conversion stage to withstand automotive transients", 2017, Texas Instruments.
TW OA issued on Sep. 27, 2024.

* cited by examiner

ELECTRICAL COUPLING CIRCUIT AND METHOD THEREOF

TECHNICAL FIELD

The technical field relates to a circuit design, in particular to an electrical coupling circuit. The technical field further relates to the electrical coupling method corresponding to the circuit.

BACKGROUND

Electric vehicles have many advantages. For example, electric vehicles can improve air pollution and be environmentally friendly. Besides, the noise caused by electric vehicles is low. Thus, electric vehicles have become a trend in future development. In order to enable an electric vehicle to operate normally and provide various necessary functions, a large number of high-voltage and high-power devices may need to be installed on the electric vehicle, and these devices are connected to the battery of the electric vehicle. However, if these devices are not correctly connected to the battery, the battery may be damaged due to reverse connection. Generally speaking, the main power cable of the battery in a large electric vehicle is equipped with several high-power and expensive anti-reverse diodes so as to prevent the above problems. In addition, medium and small-sized electric vehicles typically use expensive car-grade fool-proofing connectors to solve the above problems.

SUMMARY

An embodiment of the disclosure relates to an electrical coupling circuit, which includes a first switch module, a second switch module, an energy storage module and a control module. The first switch module includes a first main switch and a first auxiliary switch. The two ends of the first main switch and the two ends of the first auxiliary switch are connected to the first electrode of a power source and the first input end of a load respectively. The second switch module includes a second main switch and a second auxiliary switch. The two ends of the second main switch and the two ends of the second auxiliary switch are connected to the second electrode of the power source and the second input end of the load respectively. The two ends of the energy storage module are connected to the first input end and the second input end respectively. The control module is connected to the first input end, the first switch module and the second switch module.

Another embodiment of the disclosure relates to an electrical coupling method, which includes the following steps: controlling the connection state of the first electrode of a power source and one end of an energy storage module by a first main switch and a first auxiliary switch connected to each other in parallel; controlling the connection state of the second electrode of the power source and the other end of the energy storage module by a second main switch and a second auxiliary switch connected to each other in parallel, wherein the two ends of the energy storage module are connected to the first input end and the second input end of a load respectively; and controlling the first main switch, the first auxiliary switch, the second main switch and the second main switch to charge the energy storage module; and selectively changing the on/off states of the first main switch, the first auxiliary switch, the second main switch and the second main switch according to the voltage of the first input end, an initial voltage value and a predetermined voltage value greater than the initial voltage value.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRA WINGS

The disclosure will become more fully understood from the detailed description given herein below and the accompanying drawings which are given by way of illustration only, and thus are not limitative of the disclosure and wherein.

DETAILED DESCRIPTION

Figure 1:
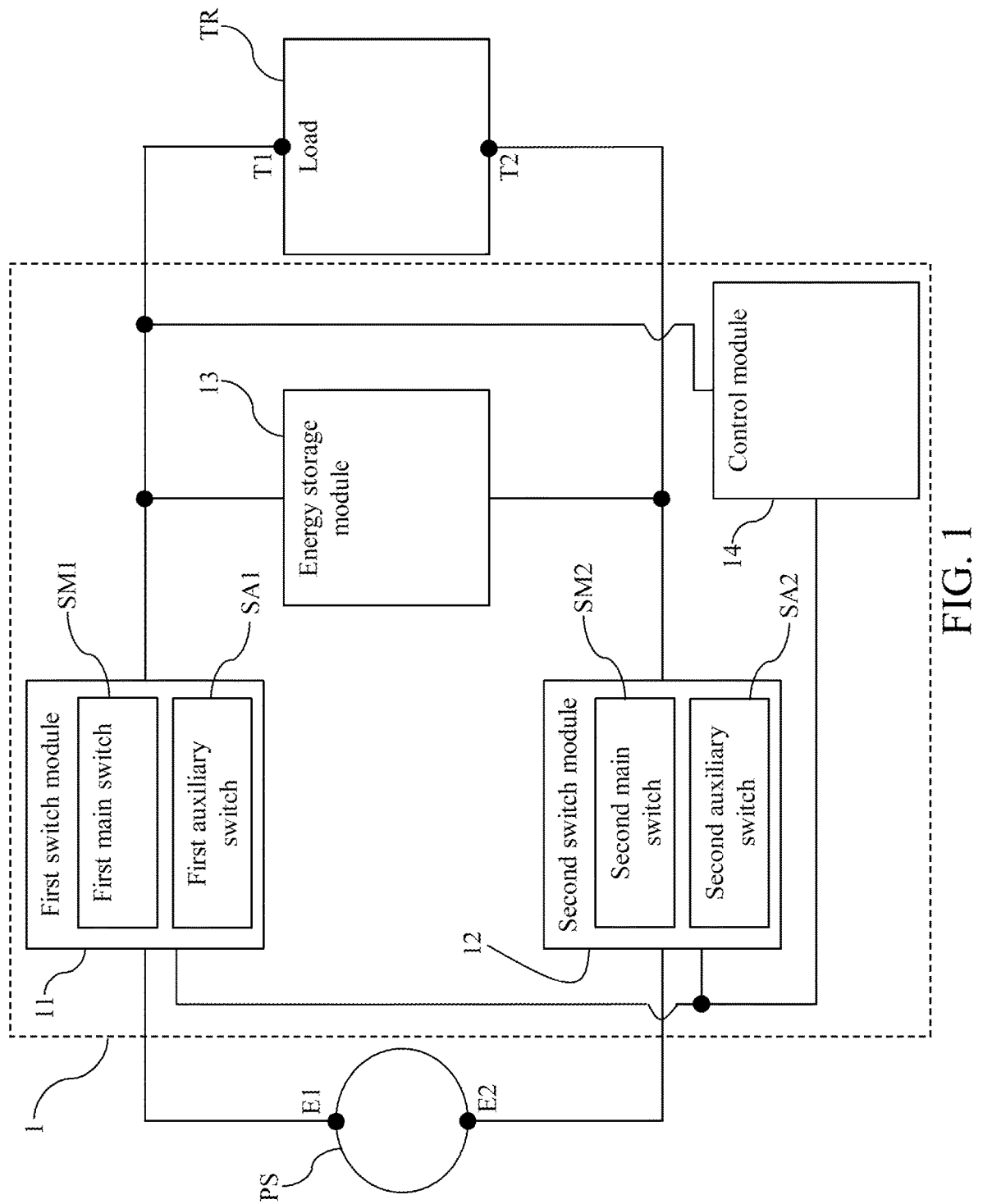
FIG. 1 is a block diagram of a circuit structure of an electrical coupling circuit in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a block diagram of a circuit structure of an electrical coupling circuit in accordance with one embodiment of the present invention. As shown in FIG. 1, the electrical coupling circuit 1 includes a first switch module 11, a second switch module 12, an energy storage module 13 and a control module 14.

The first switch module 11 includes a first main switch, SM1, and a first auxiliary switch, SA1. The two ends of the first main switch SM1 are respectively connected to the first electrode E1 of the power source PS and the first input end T1 of the load TR. The two ends of the first auxiliary switch SA1 are also respectively connected to the first electrode E1 of the power source PS and the first input end T1 of the load TR. In one embodiment, the first main switch SM1 and the first auxiliary switch SA1 can be various currently available relays or switch components. In one embodiment, the power source PS can be a rechargeable battery, such as a Li battery, a Ni—Cd battery, or a Ni-MH battery.

The second switch module 12 includes a second main switch, SM2, and a second auxiliary switch, SA2. The two ends of the second main switch SM2 are respectively connected to the second electrode E2 of the power source PS and the second input end T2 of the load TR. The first electrode E1 can be the positive electrode, and the second electrode E2 can be the negative electrode. In another embodiment, the first electrode E1 can be the negative electrode, and the second electrode E2 can be the positive electrode. The two ends of the second auxiliary switch SA2 are respectively connected to the second electrode E2 of the power source PS and the second input end T2 of the load TR. The first input end T1 can be the positive-electrode input end, and the second input end T2 can be the negative-electrode input end. In another embodiment, the first input end T1 can be the negative-electrode input end, and the second input end T2 can be the positive-electrode input end. In one embodiment, the second main switch SM2 and the second auxiliary switch SA2 can be various currently available relays or switch components. In one embodiment, the load TR can be a charger, a motor driver, an inverter, etc.

The two ends of the energy storage module 13 are respectively connected to the first input end T1 and the second input end T2. In one embodiment, the energy storage module 13 can be a DC-link capacitor or other components with energy storage functionality.

The control module 14 is connected to the first input end, T1, of the load, TR, the first switch module 11, and the second switch module 12. In one embodiment, the control module 14 can be a microcontroller unit (MCU), a central processing unit (CPU), an application-specific integrated circuit (ASIC), a field-programmable gate array (FPGA) or similar components.

The control module 14 can control the first switch module 11 (including the first main switch SM1 and the first auxiliary switch SA1) and the second switch module 12 (including the second main switch SM2 and the second auxiliary switch SA2) to charge the energy storage module 13 so as to implement a pre-charge process. Additionally, the first switch module 11 and the second switch module 12 also have anti-reverse diodes to provide the anti-reverse protection function simultaneously. After the pre-charge process is completed, a high-voltage power supply can be established to drive the load TR. The combination of the first main switch SM1 and the first auxiliary switch SA1 in the first switch module 11 can provides a redundancy mechanism. Similarly, the combination of the second main switch SM2 and the second auxiliary switch SA2 in the second switch module 12 also provides a redundancy mechanism.

Through the above circuit design, the electrical coupling circuit 1 can achieve anti-reverse protection function so as to effectively prevent damage to the power source, PS. Therefore, the service life of the power source PS can be significantly extended and the power source PS can operate normally.

The embodiment just exemplifies the present invention and is not intended to limit the scope of the present invention; any equivalent modification and variation according to the spirit of the present invention is to be also included within the scope of the following claims and their equivalents.

Figure 2:
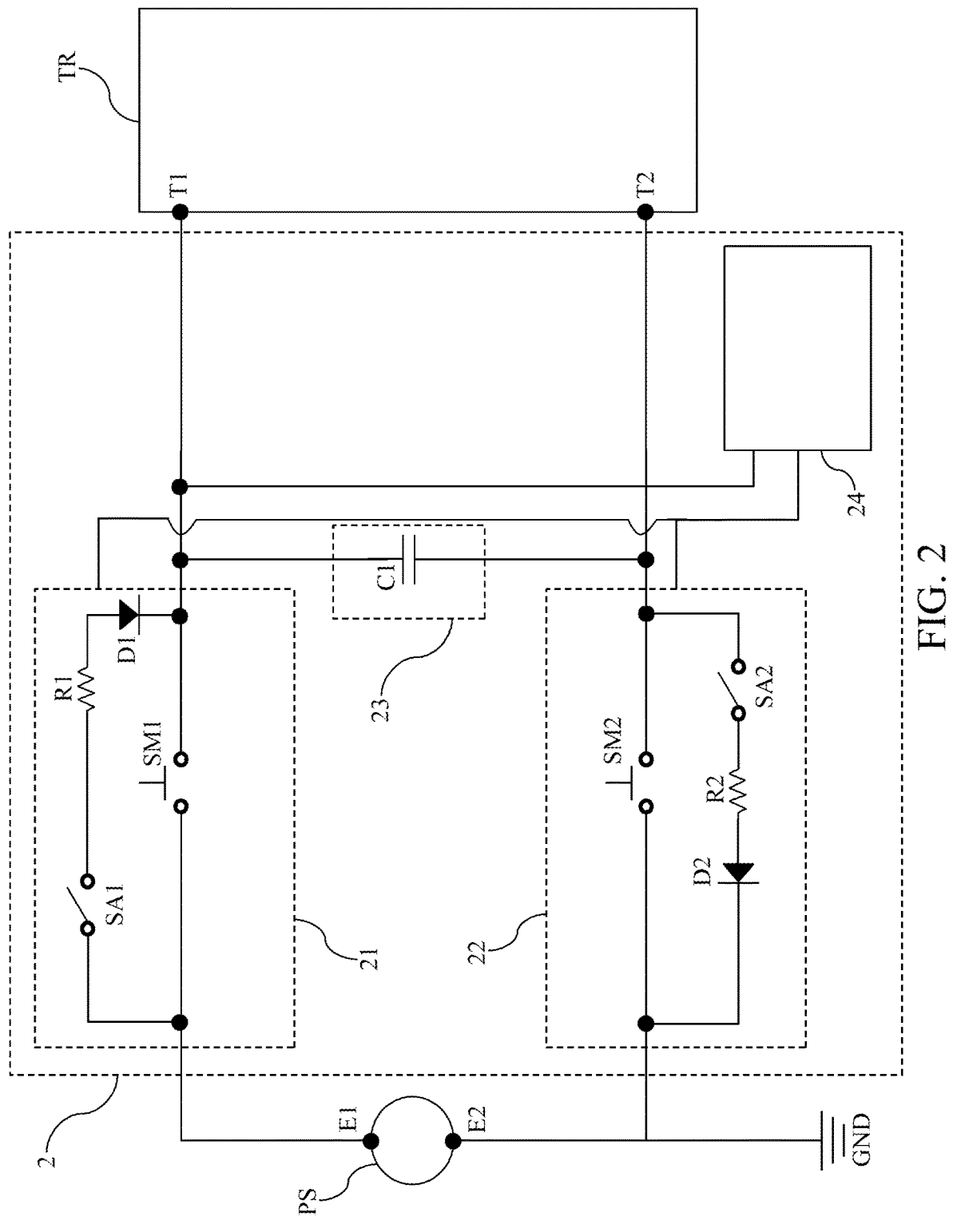
FIG. 2 is a circuit diagram of an electrical coupling circuit in accordance with another embodiment of the present invention.

Please refer to FIG. 2, which is a circuit diagram of an electrical coupling circuit in accordance with another embodiment of the present invention. This embodiment exemplifies one of possible circuit designs of the electrical coupling circuit 2, but this circuit design does not limit the scope of the disclosure. As shown in FIG. 2, the electrical coupling circuit 2 includes a first switch module 21, a second switch module 22, an energy storage module 23 and a control module 24.

The first switch module 21 includes a first main switch SM1, a first auxiliary switch SA1, a first resistor R1 and a first diode D1. One end of the first auxiliary switch SA1 is connected to the first electrode E1 of the power source PS, and the other end is connected to one end of the first resistor R1. The other end of the first resistor R1 is connected to the positive electrode of the first diode D1, while the negative electrode of the first diode D1 is connected to the first input end T1 of the load TR. The two ends of the first main switch SM1 are connected to the first electrode E1 of the power source PS and the first input end T1 of the load TR, respectively.

The second switch module 22 includes a second main switch SM2, a second auxiliary switch SA2, a second resistor R2, and a second diode D2. One end of the second auxiliary switch SA2 is connected to the second input end T2 of the load TR, and the other end is connected to one end of the second resistor R2. The other end of the second resistor R2 is connected to the positive electrode of the second diode D2, while the negative electrode of the second diode D2 is connected to the second electrode E2 of the power source PS. The second electrode E2 is also connected to the grounding point GND. The two ends of the second main switch SM2 are connected to the second electrode E2 of the power source PS and the second input end T2 of the load TR, respectively.

In this embodiment, the energy storage module 23 is a capacitor C1, and the two ends of the capacitor C1 are connected to the first input end T1 and the second input end T2.

Figure 3:
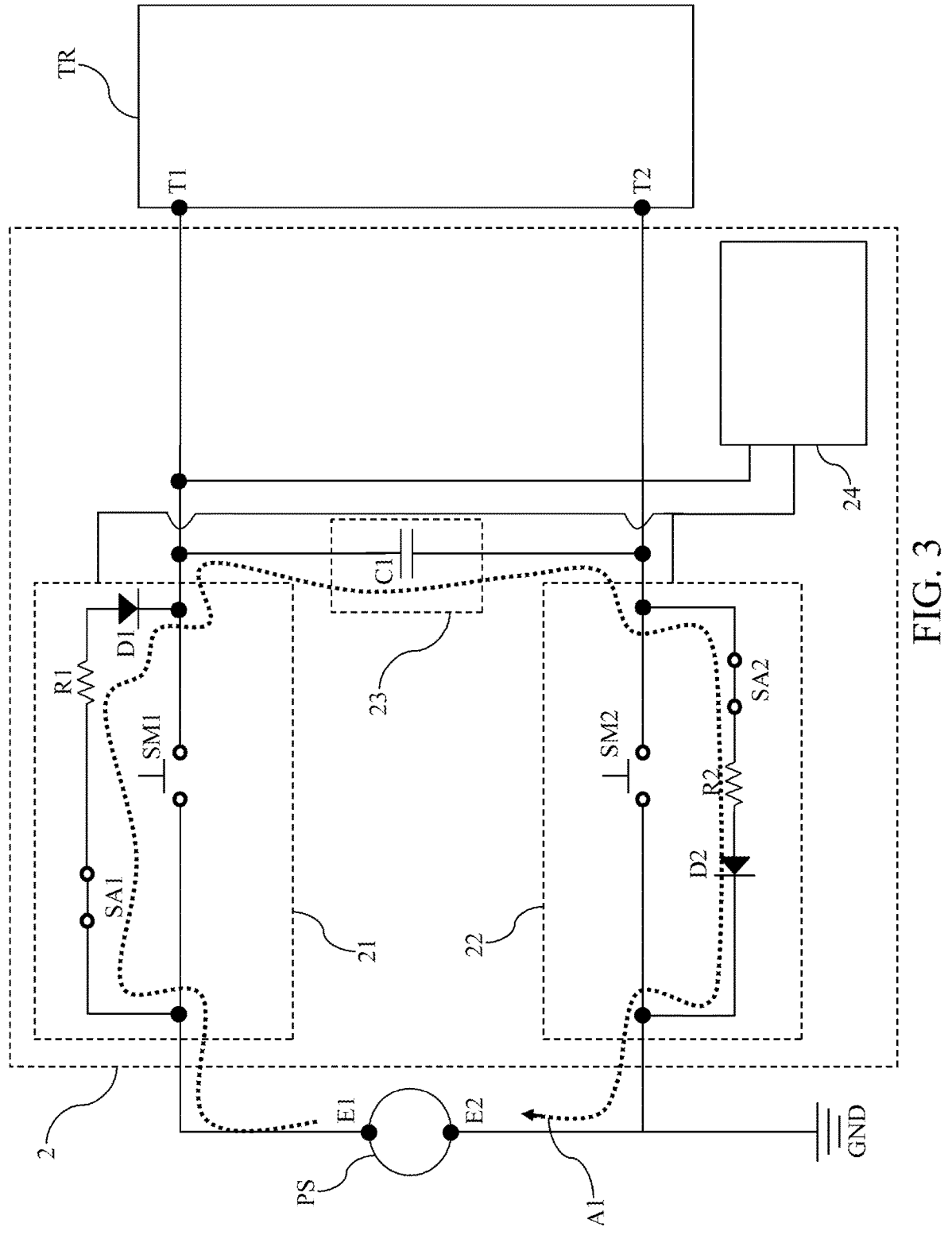
FIG. 3 is a first schematic view of the electrical coupling circuit in operation in accordance with another embodiment of the present invention.

Please refer to FIG. 3, which is a first schematic view of the electrical coupling circuit in operation in accordance with another embodiment of the present invention. As shown in FIG. 3, the control module 24 turns on the first auxiliary switch SA1 and the second auxiliary switch SA2 to perform a pre-charging process for charging the energy storage module 23. At the same time, the control module 24 detects the voltage of the first input end T1. The voltage of the first input end T1 gradually increases to an initial voltage value V1. Then, the power source PS continues to charge the energy storage module 23. The current direction during the pre-charging process is indicated by the arrow A1 in FIG. 3. Finally, when the voltage of the first input end T1 reaches a predetermined voltage value V2 greater than the initial voltage value V1, the pre-charging process is completed. Simultaneously, the control module 24 turns on the first main switch SM1 and the second main switch SM2, and turns off the first auxiliary switch SA1 and the second auxiliary switch SA2, such that the establishment of the high-voltage power supply is completed. The predetermined voltage value V2 is close to the operating voltage of the power source PS, and the predetermined voltage value V2 can be adjusted according to the characteristics of the power source PS. Besides, the predetermined voltage value V2 is greater than the initial voltage value V1.

The embodiment just exemplifies the present invention and is not intended to limit the scope of the present invention; any equivalent modification and variation according to the spirit of the present invention is to be also included within the scope of the following claims and their equivalents.

Figure 4:
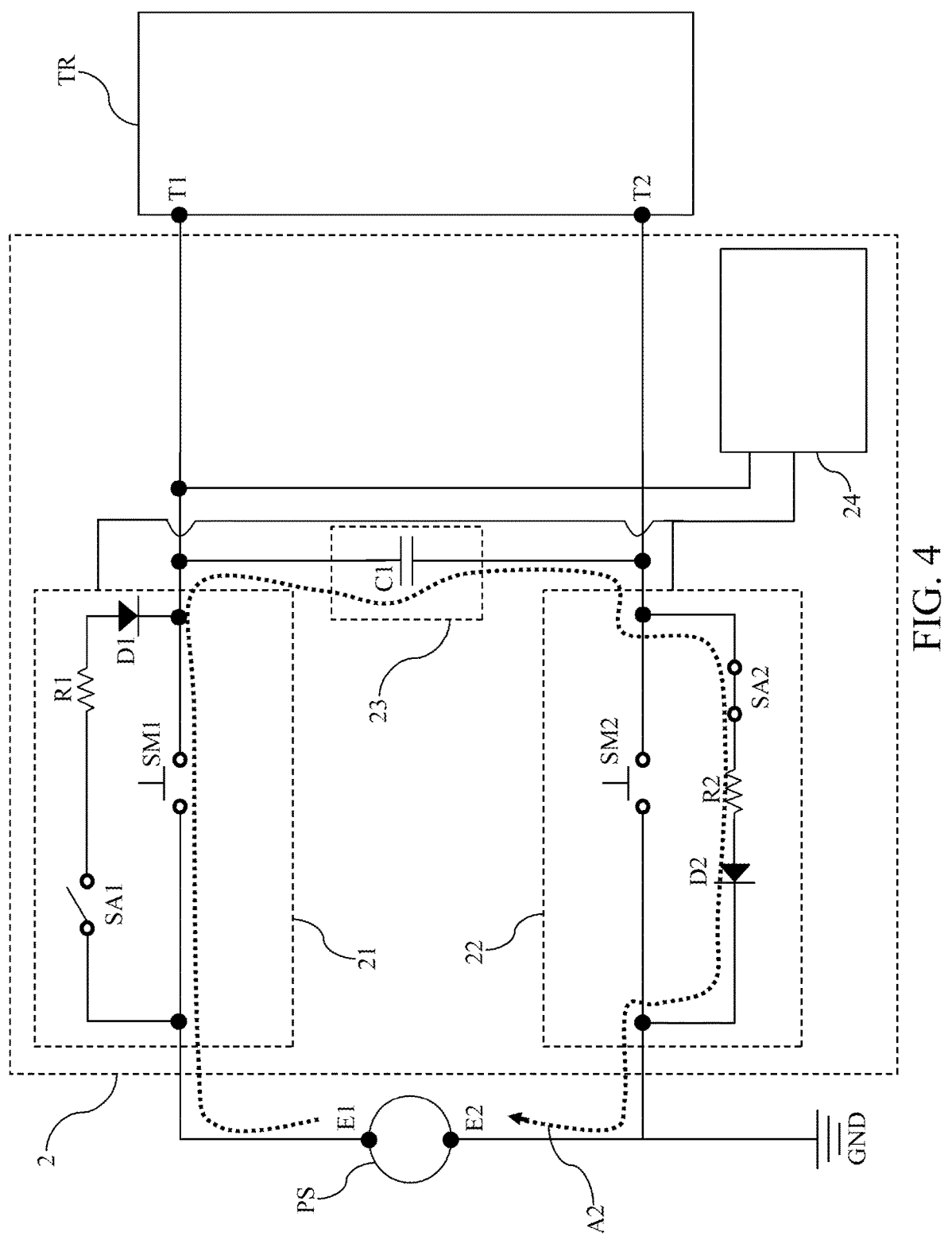
FIG. 4 is a second schematic view of the electrical coupling circuit in operation in accordance with another embodiment of the present invention.

Please refer to FIG. 4, which is a second schematic view of the electrical coupling circuit in operation in accordance with another embodiment of the present invention. As shown in FIG. 4, the control module 24 turns on the first auxiliary switch SA1 and the second auxiliary switch SA2 to perform the pre-charging process for charging the energy storage module 23. Simultaneously, the control module 24 monitors the voltage of the first input end T1. When the control module 24 determines that the voltage of the first input end T1 cannot reach the initial voltage value V1 within the first predetermined time, the control module 24 turns off the first auxiliary switch SA1 and turns on the first main switch SM1. Subsequently, the power source PS continues to charge the energy storage module 23. The current direction during the pre-charging process is indicated by the arrow A2 in FIG. 4. Finally, when the voltage of the first input end T1 reaches a predetermined voltage value V2 greater than the initial voltage value V1, the pre-charging process is completed. Simultaneously, the control module 24 turns on the second main switch SM2 and turns off the second auxiliary switch SA2, such that the high-voltage power supply is established. In this case, the control module 24 detects a fault in the first auxiliary switch SA1 during the pre-charging process and triggers the redundancy mechanism to turn on the first main switch SM1. In addition, the control module 24 generates a first abnormal signal Bs1 after the pre-charging process is completed (the control module 24 can generate the first abnormal signal Bs1 by a warning light, a buzzer, etc.).

In another case, the control module 24 turns on the first auxiliary switch SA1 and the second auxiliary switch SA2 to perform the pre-charging process for charging the energy storage module 23. Simultaneously, the control module 24 monitors the voltage of the first input end T1. When the control module 24 determines that the voltage of the first input end T1 has reached the initial voltage value V1 but cannot reach the predetermined voltage value V2 within the second predetermined time, the control module 24 turns off the first auxiliary switch SA1 and turns on the first main switch SM1. Subsequently, the power source PS continues to charge the energy storage module 23. The current direction during the pre-charging process is indicated by the arrow A2 in FIG. 4. Finally, when the voltage of the first input end T1 reaches the predetermined voltage value V2 greater than the initial voltage value V1, the pre-charging process is completed. Simultaneously, the control module 24 turns on the second main switch SM2 and turns off the second auxiliary switch SA2 in order to establish the high-voltage power supply. Similarly, the control module 24 detects a fault in the first auxiliary switch SA1 during the pre-charging process and triggers the redundancy mechanism to turn on the first main switch SM1. Further, the control module 24 generates the first abnormal signal Bs1 after the pre-charging process is completed.

The embodiment just exemplifies the present invention and is not intended to limit the scope of the present invention; any equivalent modification and variation according to the spirit of the present invention is to be also included within the scope of the following claims and their equivalents.

Figure 5:
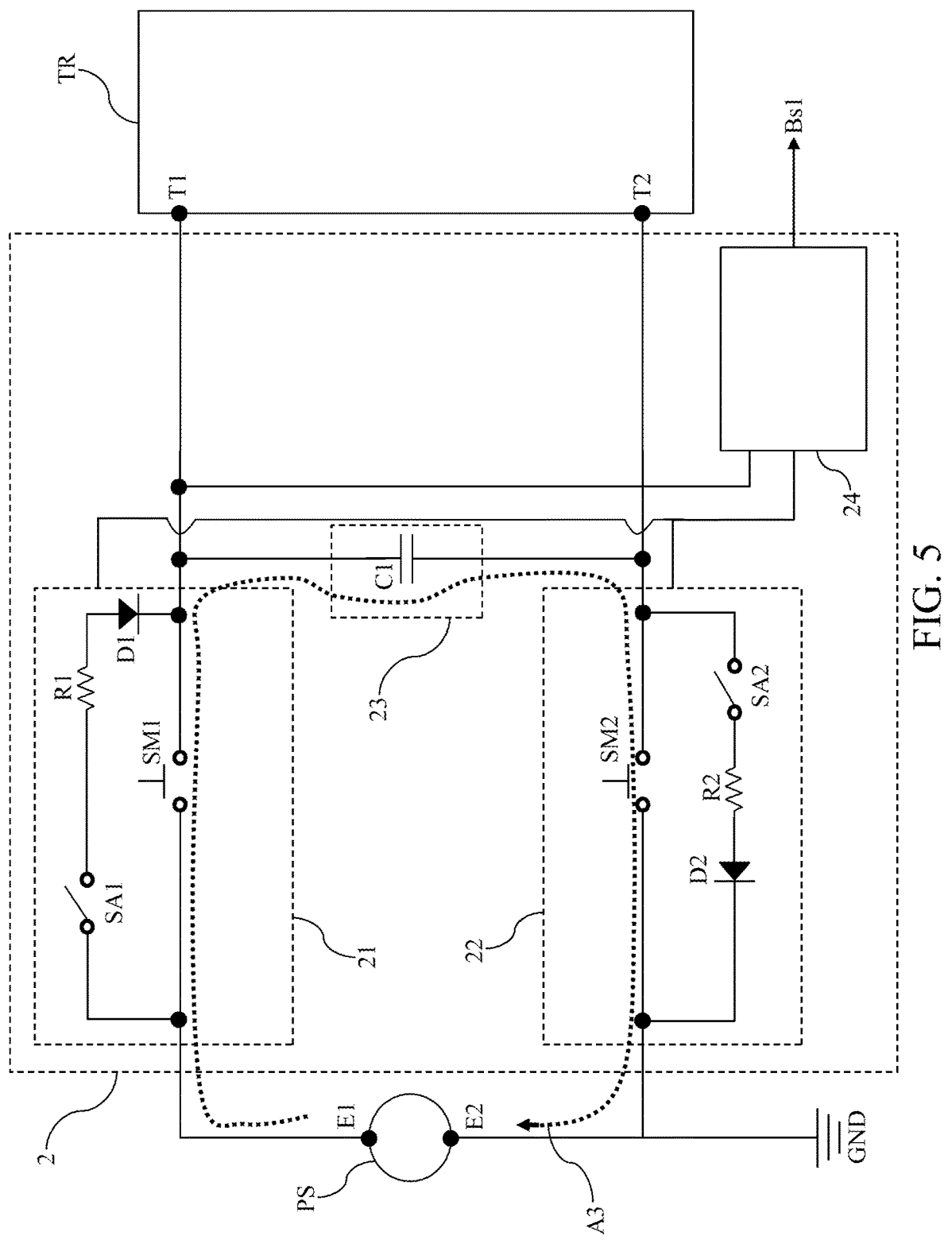
FIG. 5 is a third schematic view of the electrical coupling circuit in operation in accordance with another embodiment of the present invention.

Please refer to FIG. 5, which is a third schematic view of the electrical coupling circuit in operation in accordance with another embodiment of the present invention. As shown in FIG. 5, the control module 24 turns on the first auxiliary switch SA1 and the second auxiliary switch SA2 to perform the pre-charging process for charging the energy storage module 23. Simultaneously, the control module 24 monitors the voltage of the first input end T1. When the control module 24 determines that the voltage of the first input end T1 cannot reach the initial voltage value V1 within the first predetermined time, the control module 24 turns off the first auxiliary switch SA1 and turns on the first main switch SM1. Subsequently, when the control module 24 determines that the voltage of the first input end T1 still cannot reach the predetermined voltage value V2 within the second predetermined time, the control module 24 turns off the second auxiliary switch SA2 and turns on the second main switch SM2 so as to make the power source PS continue charging the energy storage module 23. The current direction during the pre-charging process is indicated by the arrow A3 in FIG. 5. Finally, when the voltage of the first input end T1 reaches the predetermined voltage value V2 greater than the initial voltage value V1, the pre-charging process is completed. Simultaneously, the control module 24 ends the pre-charging process to establish the high-voltage power supply. In this case, as the control module 24 triggers the redundancy mechanism during the pre-charging process, the control module 24 first turns on the first main switch SM1 and then turns on the second main switch SM2. Consequently, the control module 24 can determine that the second auxiliary switch SA2 malfunctions. Moreover, the control module 24 generates the first abnormal signal Bs1 after the pre-charging process is completed.

In another case, the control module 24 turns on the first auxiliary switch SA1 and the second auxiliary switch SA2 to perform the pre-charging process for charging the energy storage module 23. Simultaneously, the control module 24 monitors the voltage of the first input end T1. When the control module 24 determines that the voltage of the first input end T1 has reached the initial voltage value V1 but cannot reach the predetermined voltage value V2 within the second predetermined time, the control module 24 turns off the first auxiliary switch SA1 and turns on the first main switch SM1. Subsequently, the control module 24 determines that the voltage of the first input end T1 still cannot reach the predetermined voltage value V2 within the second predetermined time, the control module 24 turns off the second auxiliary switch SA2 and turns on the second main switch SM2 in order to make the power source PS to continue charging the energy storage module 23. The current direction during the pre-charging process is indicated by the arrow A3 in FIG. 5. Finally, when the voltage of the first input end T1 reaches the predetermined voltage value V2 greater than the initial voltage value V1, the pre-charging process is completed. Simultaneously, the control module 24 ends the pre-charging process to establish the high-voltage power supply. Similarly, as the control module 24 triggers the redundancy mechanism during the pre-charging process, the control module 24 first turns on the first main switch SM1 and then turns on the second main switch SM2. Consequently, the control module 24 detects that the second auxiliary switch SA2 malfunctions. In addition, the control module 24 generates the first abnormal signal Bs1 after the pre-charging process is completed.

The embodiment just exemplifies the present invention and is not intended to limit the scope of the present invention; any equivalent modification and variation according to the spirit of the present invention is to be also included within the scope of the following claims and their equivalents.

Figure 6:
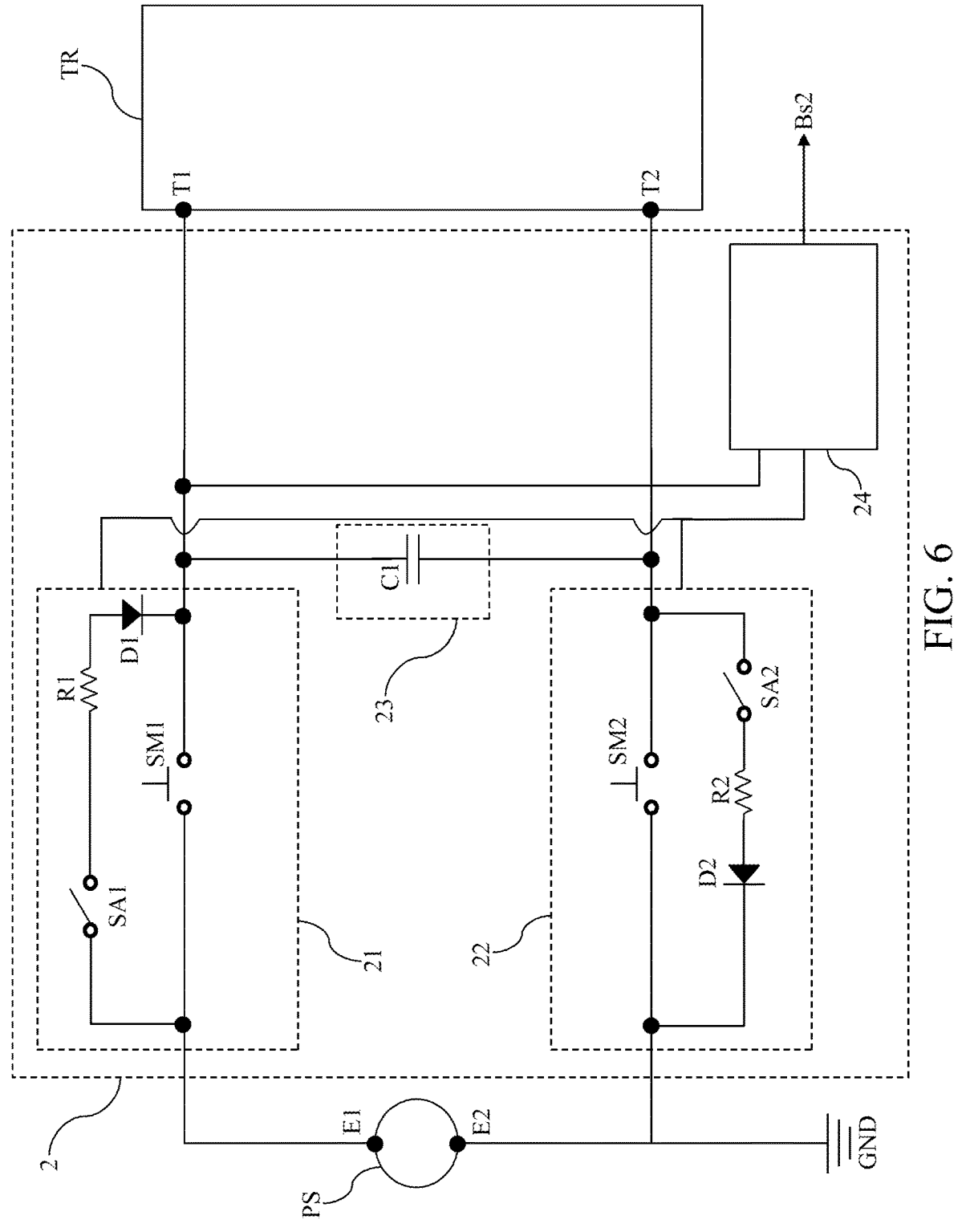
FIG. 6 is a fourth schematic view of the electrical coupling circuit in operation in accordance with another embodiment of the present invention.

Please refer to FIG. 6, which is a fourth schematic view of the electrical coupling circuit in operation in accordance with another embodiment of the present invention. As shown in FIG. 6, the control module 24 turns on the first auxiliary switch SA1 and the second auxiliary switch SA2 to perform the pre-charging process for charging the energy storage module 23. Simultaneously, the control module 24 monitors the voltage of the first input end T1. When the control module 24 determines that the voltage of the first input end T1 cannot reach the initial voltage value V1 within the first predetermined time, the control module 24 turns off the first auxiliary switch SA1 and turns on the first main switch SM1. Subsequently, the control module 24 determines that the voltage of the first input end T1 still cannot reach the default voltage value V2 within the second predetermined time, the control module 24 turns off the second auxiliary switch SA2 and turns on the second main switch SM2 so as to make the power source PS continue charging the energy storage module 23. Next, if the voltage of the first input end T1 still cannot reach the predetermined voltage value V2 within the second predetermined time, the control module 24 turns off both the first main switch SM1 and the second main switch SM2, and then generates a second abnormal signal Bs2 (the control module 24 can generate the second abnormal signal Bs2 through a warning light, a buzzer, etc.). In this case, the control module 24 cannot complete the pre-charging process and determines that the load TR is in the reverse-connection state with the power source PS. Then, the control module 24 generates the aforementioned second abnormal signal Bs2 to notify the user to take necessary measures in time.

In another case, the control module 24 turns on the first auxiliary switch SA1 and the second auxiliary switch SA2 to perform the pre-charging process for charging the energy storage module 23. Simultaneously, the control module 24 monitors the voltage of the first input end T1. When the control module 24 determines that the voltage of the first input end T1 has reached the initial voltage value V1 but cannot reach the predetermined voltage value V2 within the second predetermined time, the control module 24 disconnects the first auxiliary switch SA1 and turns on the first main switch SM1. Subsequently, when the control module 24 determines that the voltage of the first input end T1 still cannot reach the predetermined voltage value V2 within the second predetermined time, the control module 24 turns off the second auxiliary switch SA2 and turns on the second main switch SM2 so as to make the power source PS continue charging the energy storage module 23. Next, if the voltage of the first input end T1 still cannot reach the default voltage value V2 within the second predetermined time, the control module 24 turns off both the first main switch SM1 and the second main switch SM2, and then generates the second abnormal signal Bs2. Similarly, since the control module 24 cannot complete the pre-charging process, the control module 24 determines that the load TR is in the reverse-connection state with the power source PS. Thus, the control module 24 can generate the aforementioned second abnormal signal Bs2 to notify the user to take necessary measures promptly.

As previously stated, the electrical coupling circuit 2 of this embodiment can effectively prevent damage to the power source PS due to reverse connection without high-power and expensive anti-reverse diodes or car-grade mistake-proof connectors. In this way, the overall cost of the power system can be reduced.

Furthermore, in this embodiment, the electrical coupling circuit 2 has a pre-charging circuit including the first switch module 11 and the second switch module 12. The first switch module 11 includes the first main switch SM1 and the first auxiliary switch SA1, while the second switch module 12 includes the second main switch SM2 and the second auxiliary switch SA2. The control module 24 can selectively change the on/off states of the first main switch SM1, the first auxiliary switch SA1, the second main switch SM2, and the second auxiliary switch SA2 based on the voltage of the first input end T1, the initial voltage value V1, and the predetermined voltage value V2, thereby providing an effective redundancy mechanism. Thus, the electrical coupling circuit 2 can ensure the normal operation of the power system. Besides, the electrical coupling circuit 2 can generate abnormal signals to alert the user. Therefore, the user can take necessary measures promptly to prevent damage to the power source PS in order to avoid that the power system cannot normally operate.

Moreover, in this embodiment, the electrical coupling circuit 2 can combine the anti-reverse protection function with the effective redundancy mechanism, so the electrical coupling circuit 2 is suitable for high-voltage power systems, such as various electric vehicles. Furthermore, the electrical coupling circuit 2 can achieve a bidirectional circuit-breaking safety protection function. As a result, the reliability of the electrical coupling circuit 2 is significantly enhanced, and the electrical coupling circuit 2 can also achieve high efficiency.

The embodiment just exemplifies the present invention and is not intended to limit the scope of the present invention; any equivalent modification and variation according to the spirit of the present invention is to be also included within the scope of the following claims and their equivalents.

It is worthy to point out that currently available electric vehicles usually need to adopt expensive anti-reverse diodes with high power consumption or car-grade mistake-proof connectors in order to prevent power sources from being damage, which significantly increase the costs of the power systems thereof. By contrast, according to one embodiment of the present invention, the electrical coupling circuit includes a first switch module, a second switch module, an energy storage module and a control module. The first switch module includes a first main switch and a first auxiliary switch. The two ends of the first main switch and the two ends of the first auxiliary switch are connected to the first electrode of a power source and the first input end of a load respectively. The second switch module includes a second main switch and a second auxiliary switch. The two ends of the second main switch and the two ends of the second auxiliary switch are connected to the second electrode of the power source and the second input end of the load respectively. The two ends of the energy storage module are connected to the first input end and the second input end respectively. The control module is connected to the first input end, the first switch module and the second switch module. The first switch module can serve as a positive-electrode pre-charging circuit, while the first diode can serve as a positive-electrode anti-reverse diode. The second switch module can serve as a negative-electrode pre-charging circuit, while the second diode can serve as a negative-electrode anti-reverse diode. Via the above circuit design, the electrical coupling circuit can achieve the anti-reverse protection function, which can effectively prevent damage to the power source and enhancing the service life of the power source.

Furthermore, according to one embodiment of the present invention, the electrical coupling circuit has a pre-charging circuit that includes the first switch module and the second switch module, which can provide the anti-reverse protection function. Therefore, the electrical coupling circuit does not need to use high-power and expensive anti-reverse diodes and expensive car-grade mistake-proof connectors, but the circuit can still effectively prevent damage to the power source due to reverse connection. Consequently, the circuit design of the electrical coupling circuit can significantly reduce the overall cost of the power system so as to meet actual requirements.

Further, according to one embodiment of the present invention, the electrical coupling circuit has the pre-charging circuit that includes the first switch module and the second switch module. The first switch module includes the first main switch and the first auxiliary switch, while the second switch module includes the second main switch and the second auxiliary switch. Accordingly, the electrical coupling circuit can execute an effective redundancy mechanism. Therefore, the electrical coupling circuit can make sure that the power system can normally operate.

Moreover, according to one embodiment of the present invention, the electrical coupling circuit can combine the anti-reverse protection function and the effective redundancy mechanism, so the circuit is suitable for high-voltage power systems (various electric vehicles) and achieving bipolar circuit breaker safety protection. Consequently, the reliability and performance of the electrical coupling circuit can be significantly enhanced.

Furthermore, according to the embodiments disclosed herein, the electrical coupling circuit can trigger the redundancy mechanism and generate a first abnormal signal to alter the user when there is an abnormality in the first switch module or the second switch module. The electrical coupling circuit can also generate a second abnormal signal when a reverse connection occurs in the power source in order to alert the user. Therefore, the user can take necessary measures promptly to prevent power source from being damage and make sure that the power system can normally operate. As set forth above, the electrical coupling circuit according to the embodiments of the present invention can indeed achieve great technical effects.

Figure 7:
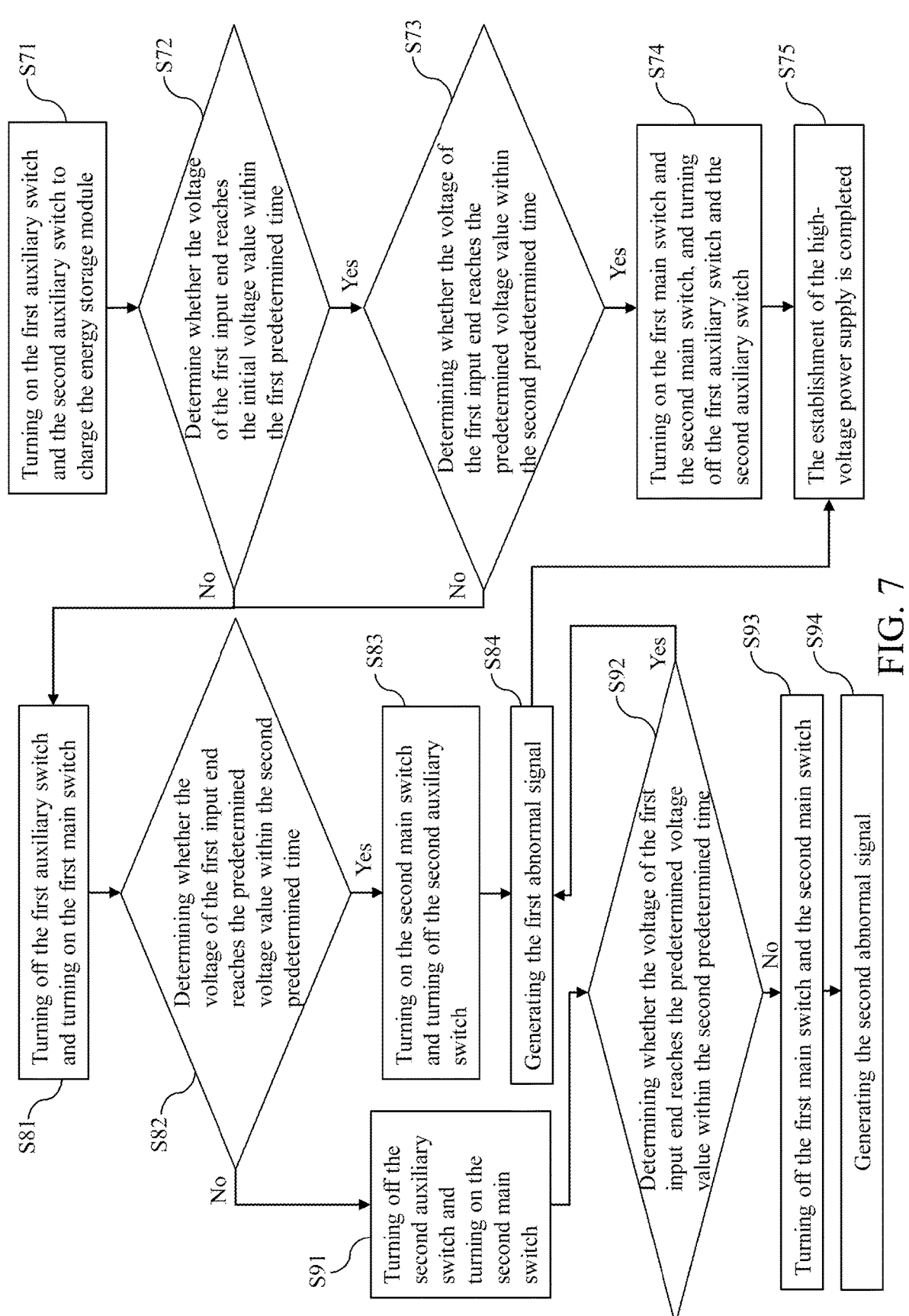
FIG. 7 is a flow chart of an electrical coupling method in operation in accordance with another embodiment of the present invention.

Please refer to FIG. 7, which is a flow chart of an electrical coupling method in operation in accordance with another embodiment of the present invention. Please also refer to FIG. 2~FIG. 6. As described above, the electrical coupling circuit 2 can control the connection between the first electrode E1 of the power source PS and one end of the energy storage module 13 through the first main switch SM1 and first auxiliary switch SA1 connected to each other in parallel. Similarly, the electrical coupling circuit 2 can control the connection between the second electrode E2 of the power source PS and the other end of the energy storage module 13 through the second main switch SM2 and second auxiliary switch SA2 connected to each other in parallel. The two ends of the energy storage module 13 are connected to the first input end T1 and the second input end T2 of the load TR, respectively. The electrical coupling circuit 2 can selectively change the switch states of the first main switch SM1, first auxiliary switch SA1, second main switch SM2, and second auxiliary switch SA2 based on the voltage of the first input end T1, the initial voltage value V1, and the predetermined voltage value V2 greater than the initial voltage value V1. In this way, the electrical coupling circuit 2 can control the first main switch SM1, first auxiliary switch SA1, second main switch SM2, and second auxiliary switch SA2 to charge the energy storage module 13. The electrical coupling method of this embodiment includes the following steps:

Step S71: turning on the first auxiliary switch and the second auxiliary switch to charge the energy storage module; then, the process proceeds to Step S72.

Step S72: determine whether the voltage of the first input end reaches the initial voltage value within the first predetermined time; if it does, the process proceeds to Step S73; if it does not, the process proceeds to Step S81.

Step S73: determining whether the voltage of the first input end reaches the predetermined voltage value within the second predetermined time; if it does, the process proceeds to Step S74; if it does not, the process proceeds to Step S81.

Step S74: turning on the first main switch and the second main switch, and turning off the first auxiliary switch and the second auxiliary switch; then, the process proceeds to Step S75.

Step S75: the establishment of the high-voltage power supply is completed.

Step S81: turning off the first auxiliary switch and turning on the first main switch; then, the process proceeds to Step S82.

Step S82: determining whether the voltage of the first input end reaches the predetermined voltage value within the second predetermined time; if it does, the process proceeds to Step S83; if it does not, the process proceeds to Step S91.

Step S83: turning on the second main switch and turning off the second auxiliary switch; then, the process proceeds to Step S84.

Step S84: generating the first abnormal signal; then, the process proceeds to Step S75.

Step S91: turning off the second auxiliary switch and turning on the second main switch; then, the process proceeds to Step S92.

Step S92: determining whether the voltage of the first input end reaches the predetermined voltage value within the second predetermined time. If it does, the process proceeds to Step S84; if it does not, the process proceeds to Step S93.

Step S93: turning off the first main switch and the second main switch; then, the process proceeds to Step S94.

Step S94: generating the second abnormal signal.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the electrical coupling circuit includes a first switch module, a second switch module, an energy storage module and a control module. The first switch module includes a first main switch and a first auxiliary switch. The two ends of the first main switch and the two ends of the first auxiliary switch are connected to the first electrode of a power source and the first input end of a load respectively. The second switch module includes a second main switch and a second auxiliary switch. The two ends of the second main switch and the two ends of the second auxiliary switch are connected to the second electrode of the power source and the second input end of the load respectively. The two ends of the energy storage module are connected to the first input end and the second input end respectively. The control module is connected to the first input end, the first switch module and the second switch module. The first switch module can serve as a positive-electrode pre-charging circuit, while the first diode can serve as a positive-electrode anti-reverse diode. The second switch module can serve as a negative-electrode pre-charging circuit, while the second diode can serve as a negative-electrode anti-reverse diode. Via the above circuit design, the electrical coupling circuit can achieve the anti-reverse protection function, which can effectively prevent damage to the power source and enhancing the service life of the power source.

Furthermore, according to one embodiment of the present invention, the electrical coupling circuit has a pre-charging circuit that includes the first switch module and the second switch module, which can provide the anti-reverse protection function. Therefore, the electrical coupling circuit does not need to use high-power and expensive anti-reverse diodes and expensive car-grade fool-proofing connectors, but the circuit can still effectively prevent damage to the power source due to reverse connection. Consequently, the circuit design of the electrical coupling circuit can significantly reduce the overall cost of the power system so as to meet actual requirements.

Further, according to one embodiment of the present invention, the electrical coupling circuit has the pre-charging circuit that includes the first switch module and the second switch module. The first switch module includes the first main switch and the first auxiliary switch, while the second switch module includes the second main switch and the second auxiliary switch. Accordingly, the electrical coupling circuit can execute an effective redundancy mechanism. Therefore, the electrical coupling circuit can make sure that the power system can normally operate.

Moreover, according to one embodiment of the present invention, the electrical coupling circuit can combine the anti-reverse protection function and the effective redundancy mechanism, so the circuit is suitable for high-voltage power systems (various electric vehicles) and achieving bipolar circuit breaker safety protection. Consequently, the reliability and performance of the electrical coupling circuit can be significantly enhanced.

Furthermore, according to the embodiments disclosed herein, the electrical coupling circuit can trigger the redundancy mechanism and generate a first abnormal signal to alter the user when there is an abnormality in the first switch module or the second switch module. The electrical coupling circuit can also generate a second abnormal signal when a reverse connection occurs in the power source in order to alert the user. Therefore, the user can take necessary measures promptly to prevent power source from being damage and make sure that the power system can normally operate.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electrical coupling circuit, comprising:
a first switch module comprising a first main switch and a first auxiliary switch, wherein two ends of the first main switch and two ends of the first auxiliary switch are connected to a first electrode of a power source and a first input end of a load respectively;
a second switch module comprising a second main switch and a second auxiliary switch, wherein two ends of the second main switch and two ends of the second auxiliary switch are connected to a second electrode of the power source and a second input end of the load respectively;
an energy storage module, wherein two ends of the energy storage module are connected to the first input end and the second input end of the load respectively; and
a control module connected to the first input end of the load, the first switch module and the second switch module;
wherein the control module is configured to turn on the first auxiliary switch and the second auxiliary switch to perform a pre-charging process for charging the energy storage module, wherein when the control module determines that a voltage of the first input end fails to reach an initial voltage value within a first predetermined time or the voltage of the first input end reaches the initial voltage value but fails to reach a predetermined voltage value greater than the initial volage value within a second predetermined time, the control module is configured to turn off the first auxiliary switch and turn on the first main switch, wherein the control module determines that the voltage of the first input end fails to reach the predetermined voltage value within the second predetermined time, the control module is configured to turn off the second auxiliary switch and turn on the second main switch so as to continue the pre-charging process, wherein when the voltage of the first input end fails to reach the predetermined voltage value within the second predetermined time, the control module is configured to turn off both the first main switch and the second main switch, and generate an abnormal signal standing for a reverse-connection state.

2. The electrical coupling circuit of claim 1, wherein the first switch module further comprises a first resistor and a second diode, and one end of the first auxiliary switch is connected to the first input end of the load via the first resistor and the first diode.

3. The electrical coupling circuit of claim 1, wherein the second switch module further comprises a second resistor and a second diode, and one end of the second auxiliary switch is connected to the second electrode of the power source via the second resistor and the second diode.

4. The electrical coupling circuit of claim 1, wherein the control module turns on the first auxiliary switch and the second auxiliary switch to charge the energy storage module, wherein the control module turns on the first main switch and the second main switch while turning off the first auxiliary switch and the second auxiliary switch when the voltage of the first input end of the load reaches the initial voltage value and reaches the predetermined voltage value greater than the initial voltage value.

5. The electrical coupling circuit of claim 1, wherein the control module turns on the first auxiliary switch and the second auxiliary switch to charge the energy storage module, wherein the control module turns off the first auxiliary switch and turns on the first main switch when the voltage of the first input end of the load fails to reach the initial voltage value, wherein the control module turns on the second main switch, turns off the second auxiliary switch and generates a first abnormal signal when the voltage of the first input end of the load reaches the initial voltage value and reaches the predetermined voltage value greater than the initial voltage value.

6. The electrical coupling circuit of claim 1, wherein the control module turns on the first auxiliary switch and the second auxiliary switch to charge the energy storage module, wherein the control module turns off the first auxiliary switch and turns on the first main switch when the voltage of the first input end of the load fails to reach the initial voltage value, wherein the control module turns off the second auxiliary switch and turns on the second main switch when the voltage of the first input end of the load still fails to reach the predetermined voltage value greater than the initial voltage value, and then the control module generates a first abnormal signal when the voltage of the first input end of the load reaches the predetermined voltage value.

7. The electrical coupling circuit of claim 1, wherein the control module turns on the first auxiliary switch and the second auxiliary switch to charge the energy storage module, wherein the control module turns off the first auxiliary switch and turns on the first main switch when the voltage of the first input end of the load fails to reach the initial voltage value, wherein the control module turns off the second auxiliary switch and turns on the second main switch when the voltage of the first input end of the load still fails to reach the predetermined voltage value greater than the initial voltage value, wherein the control module turns offs the first main switch and the second main switch when the voltage of the first input end of the load still fails to reach the predetermined voltage value, and generates a second abnormal signal.

8. The electrical coupling circuit of claim 1, wherein the control module turns on the first auxiliary switch and the second auxiliary switch to charge the energy storage module, wherein the control module turns off the first auxiliary switch and turns on the first main switch when the voltage of the first input end of the load reaches the initial voltage value but fails to reach the predetermined voltage value greater than the initial voltage value, wherein the control module turns on the second main switch and turns off the second auxiliary switch when the voltage of the first input end of the load reaches the predetermined voltage value, and generates a first abnormal signal.

9. The electrical coupling circuit of claim 1, wherein the control module turns on the first auxiliary switch and the second auxiliary switch to charge the energy storage module, wherein the control module turns off the first auxiliary switch and turns on the first main switch when the voltage of the first input end of the load reaches the initial voltage value but fails to reach the predetermined voltage value greater than the initial voltage value, wherein the control module turns off the second auxiliary switch and turns on the second main switch when the voltage of the first input end of the load fails to reach the predetermined voltage value, wherein the control module turns on the first main switch and turns off the first auxiliary switch when the voltage of the first input end of the load reaches the predetermined voltage value, and generates a first abnormal signal.

10. The electrical coupling circuit of claim 1, wherein the control module turns on the first auxiliary switch and the second auxiliary switch to charge the energy storage module, wherein the control module turns off the first auxiliary switch and turns on the first main switch when the voltage of the first input end of the load reaches the initial voltage value but fails to reach the predetermined voltage value greater than the initial voltage, wherein the control module turns off the second auxiliary switch and turns on the second main switch when the voltage of the first input end of the load fails to reach the predetermined voltage value, wherein the control module turns off the first main switch and the second main switch when the voltage of the first input end of the load still fails to reach the predetermined voltage value, and generates a second abnormal signal.

11. The electrical coupling circuit of claim 1, wherein the energy storage module is a capacitor.

12. An electrical coupling method, comprising:
controlling a connection state of a first electrode of a power source and one end of an energy storage module by a first main switch and a first auxiliary switch connected to each other in parallel;
controlling a connection state of a second electrode of the power source and another end of the energy storage module by a second main switch and a second auxiliary switch connected to each other in parallel, wherein two ends of the energy storage module are connected to a first input end and a second input end of a load respectively;
turn on the first auxiliary switch and the second auxiliary switch to perform a pre-charging process for charging the energy storage module;
turning off the first auxiliary switch and turning on the first main switch when a voltage of the first input end fails to reach an initial voltage value within a first predetermined time or the voltage of the first input end reaches the initial voltage value but fails to reach a predetermined voltage value greater than the initial volage value within a second predetermined time;
turning off the second auxiliary switch and turning on the second main switch so as to continue the pre-charging process when the voltage of the first input end fails to reach the predetermined voltage value within the second predetermined time; and
turning off both the first main switch and the second main switch, and generating an abnormal signal standing for a reverse-connection state when the voltage of the first input end fails to reach the predetermined voltage value within the second predetermined time.

13. The electrical coupling method of claim 12, further comprising:
turning on the first auxiliary switch and the second auxiliary switch to charge the energy storage module; and
turning on the first main switch and the second main switch when the voltage of the first input end of the load reaches the initial voltage value and reaches the predetermined voltage value, and turning off the first auxiliary switch and the second auxiliary switch.

14. The electrical coupling method of claim 12, further comprising:
turning on the first auxiliary switch and the second auxiliary switch to charge the energy storage module;
turning off the first auxiliary switch and turning on the first main switch when the voltage of the first input end of the load fails to reach the initial voltage value;
turning on the second main switch and turning off the second auxiliary switch when the voltage of the first input end of the load reaches the initial voltage value and further reaches the predetermined voltage value; and
generating a first abnormal signal.

15. The electrical coupling method of claim 12, further comprising:
turning on the first auxiliary switch and the second auxiliary switch to charge the energy storage module;
turning off the first auxiliary switch and turning on the first main switch when the voltage of the first input end of the load fails to reach the initial voltage value;

turning off the second auxiliary switch and turning on the second main switch when the voltage of the first input end of the load still fails to reach the predetermined voltage value; and generating a first abnormal signal when the voltage of the first input end of the load reaches the predetermined voltage value.

16. The electrical coupling method of claim 12, further comprising:

turning on the first auxiliary switch and the second auxiliary switch to charge the energy storage module;

turning off the first auxiliary switch and turning on the first main switch when the voltage of the first input end of the load fails to reach the initial voltage value;

turning off the second auxiliary switch and turning on the second main switch when the voltage of the first input end of the load still fails to reach the predetermined voltage value;

turning off the first main switch and the second main switch when the voltage of the first input end of the load still fails to reach the predetermined voltage value; and generating a second abnormal signal.

17. The electrical coupling method of claim 12, further comprising:

turning on the first auxiliary switch and the second auxiliary switch to charge the energy storage module;

turning off the first auxiliary switch and turning on the first main switch when the voltage of the first input end of the load reaches the initial voltage value but fails to reach the predetermined voltage value;

turning on the second main switch and turning off the second auxiliary switch when the voltage of the first input end of the load reaches the predetermined voltage value; and generating a first abnormal signal.

18. The electrical coupling method of claim 12, further comprising:

turning on the first auxiliary switch and the second auxiliary switch to charge the energy storage module;

turning off the first auxiliary switch and turning on the first main switch when the voltage of the first input end of the load reaches the initial voltage value but fails to reach the predetermined voltage value;

turning off the second auxiliary switch and turning on the second main switch when the voltage of the first input end of the load fails to reach the predetermined voltage value;

turning on the first main switch and turning off the first auxiliary switch when the voltage of the first input end of the load reaches the predetermined voltage value; and generating a first abnormal signal.

19. The electrical coupling method of claim 12, further comprising:

turning on the first auxiliary switch and the second auxiliary switch to charge the energy storage module;

turning off the first auxiliary switch and turning on the first main switch when the voltage of the first input end of the load reaches the initial voltage value but fails to reach the predetermined voltage value;

turning off the second auxiliary switch and turning on the second main switch when the voltage of the first input end of the load fails to reach the predetermined voltage value;

turning off the first main switch and the second main switch when the voltage of the first input end of the load still fails to reach the predetermined voltage value; and generating a second abnormal signal.

20. The electrical coupling method of claim 12, wherein one end of the first auxiliary switch is connected to the energy storage module via a first resistor and a first diode.

21. The electrical coupling method of claim 12, wherein one end of the second auxiliary switch is connected to the second electrode of the power source through a second resistor and a second diode.

22. The electrical coupling method of claim 12, wherein the energy storage module is a capacitor.

\* \* \* \* \*